United States Patent [19]
Purtell

[11] 3,746,258
[45] July 17, 1973

[54] SHAFT-DRIVEN AUTOMATICALLY ALIGNED IRRIGATION SYSTEM

[76] Inventor: Rufus J. Purtell, P.O. Box 1152, Brownfield, Tex. 79316

[22] Filed: July 3, 1972

[21] Appl. No.: 268,601

[52] U.S. Cl.................. 239/212, 137/344, 239/177
[51] Int. Cl.......................... B05b 3/18, B05b 15/00
[58] Field of Search................... 239/212, 213, 177; 137/344

[56] References Cited
UNITED STATES PATENTS
3,417,766  12/1968  Purtell .......................... 239/212 X
3,590,853  7/1971  Haynes .......................... 239/212 X

*Primary Examiner*—Robert S. Ward, Jr.
*Attorney*—Charles W. Coffee

[57] ABSTRACT

On a shaft-driven automatically aligned irrigation system, the system is automatically aligned by the change in the length of the shaft because of misalignment. Therefore upon reversing the direction of the shaft, the shaft automatically shifts from alignment in the forward direction to alignment in the reverse direction.

3 Claims, 4 Drawing Figures

Patented July 17, 1973 3,746,258

SHAFT-DRIVEN AUTOMATICALLY ALIGNED IRRIGATION SYSTEM

BACKGROUND OF THE INVENTION

1. Field of the Invention

This invention relates to agricultural irrigation and, more particularly, to aligning a shaft-driven vehicle system moving agricultural irrigation sprinkler pipe.

2. Description of the Prior Art

I have previously been issued a patent entitled AUTOMATIC ALIGNMENT OF IRRIGATION SYSTEM, U.S. Pat. No. 3,417,766. That patent discloses an embodiment in FIGS. 8 and 9, which is commercially on the market.

This embodiment which is commercially on the market uses the length of the shaft to detect misalignment. When misalignment is detected, the diameter of the adjustable diameter drive pulleys are adjusted accordingly to increase or decrease the speed of the vehicles. In the patent and on the commercial system, there is a reversing crank 122 and it is necessary to manually reverse the reversing crank at each vehicle each time the system is changed from either forward drive or reverse drive.

SUMMARY OF THE INVENTION

1. New and Different Function

I have solved the problem of manually reversing the reversing crank by providing a shaft reverser to automatically accomplish the same purpose as was accomplished by the crank. I have accomplished this by placing a helical element or nut upon one segment of the shaft and a stud upon the other element of the shaft. When the shaft is reversed, the stud assumes a new position with respect to the nut, thus positioning it for the correct position for forward movement or reverse movement.

2. Objects of this Invention

An object of this invention is to maintain an irrigation system in alignment in either forward or reverse movement.

Another object is to change from forward to reverse movement.

Other objects are to achieve the above with a device that is sturdy, compact, durable, lightweight, simple, safe, efficient, and reliable, yet inexpensive and easy to manufacture, install, operate, and maintain.

Further objects are to achieve the above with a method that is rapid, efficient, and inexpensive, and does not require skilled people to install, adjust, operate, and maintain.

The specific nature of the invention, as well as other objects, uses, and advantages thereof, will clearly appear from the following description and from the accompanying drawing, the different views of which are not to the same scale.

DESCRIPTION OF THE PREFERRED EMBODIMENT

Figure 1:
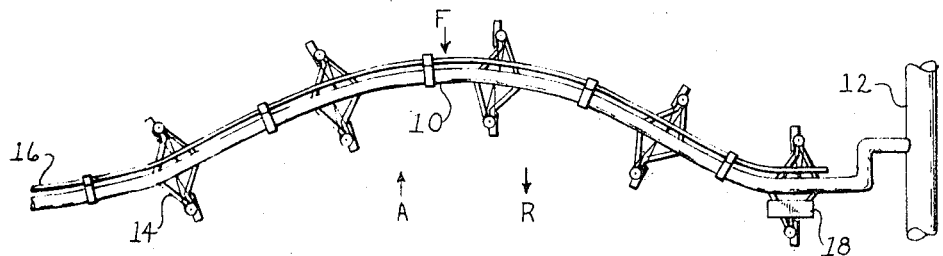
FIG. 1 is a schematic top plan view of a system in which my invention is incorporated.

Referring more particularly to FIG. 1 of the drawing, it may be seen the complete system according to this invention. Elongated pipe 10 is adapted to carry sprinklers thereon as is well known in the art. The pipe includes detachable means (not shown for clarity) by which it is attached to main pipe or header pipe 12. In this situation the main pipe 12 is a supply of water under pressure to the moving pipe 10 and header pipe 12 could be considered means attached to the pipe for supplying water under pressure to the moving pipe 10 and header pipe 12 could be considered means attached to the pipe for supplying water under pressure.

Plurality of vehicles 14 movingly support the pipe. The vehicles are driven by drive shaft 16. The drive shaft 16 is connected to the vehicles 14 so if the drive shaft is rotated in forward rotation, arrow "alpha," the system will have a forward movement as seen by arrow A. If the drive shaft is driven in a reverse rotation, arrow "rho", the system will have an opposite or reverse movement, arrow R. Motor 18 shown schematically in the drawings on one of the vehicles 14 is means for rotating the shaft 16 in either a forward or reverse rotation. Belt 20 is a portion of drive means on each of the vehicles 14 for driving the vehicle responsive to rotation of the drive shaft 16.

The drive shaft 16 will form a means for measuring the curve of the pipe as more particularly described in my U.S. Pat. No. 3,417,766. In an exaggerated position as illustrated in FIG. 1, the shaft 16 will become stretched at forward point F which will mean tie bolts 22 will pull against plate 24 and pull fingers 26 so as to pull right half 28 of the sheave open against pressure of spring 30. Therefore, the belt 20 will be operating on a smaller diameter of the sheave halves 28 and 32 than otherwise. Thus, the vehicles along the forward point F are driven slower. The plates 24 and the fingers 26 are pulled when the irrigation system is moving in a forward direction.

Figure 3:
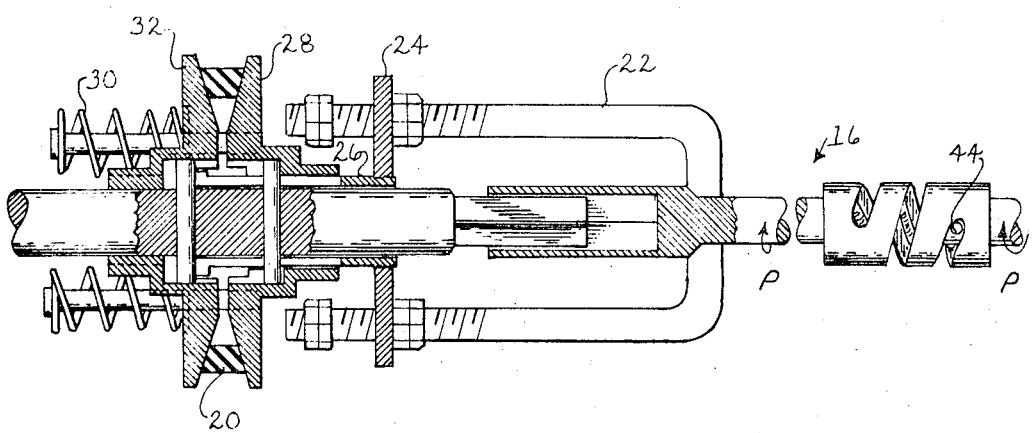
FIG. 3 is a side elevational view of the shaft with parts broken away and in section for clarity showing my invention with the shaft rotating in the reverse direction.

If the shaft 16 is rotating in the reverse direction, arrow "rho" as seen in FIG. 3, the system moves in the reverse direction, arrow R in FIG. 1. Then point F will be a following point. The fingers 26 are being pushed by the tie bolts 22 through the plate 24 so they are pushing against an element of the two halves 28 and 32 of the pulley so the halves of the pulley are closed together and therefore, the speed of the belt 20 increases to make the following point F move faster to become aligned again.

Figure 2:
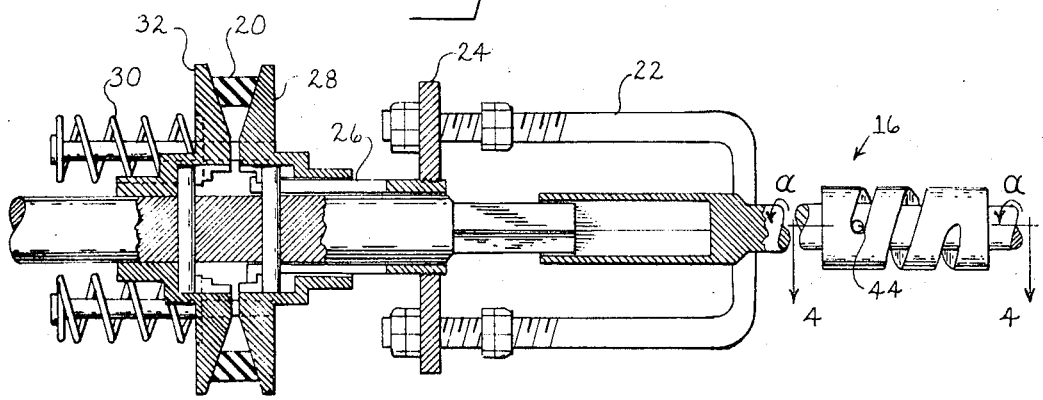
FIG. 2 is a side elevational view of the shaft with the shaft rotating in the forward direction with some parts broken away and in section for clarity.

The explanation of the mechanism shown in FIGS. 2 and 3 is more particularly shown and described in my prior patent, but this review is given for the understanding of this application.

Figure 4:
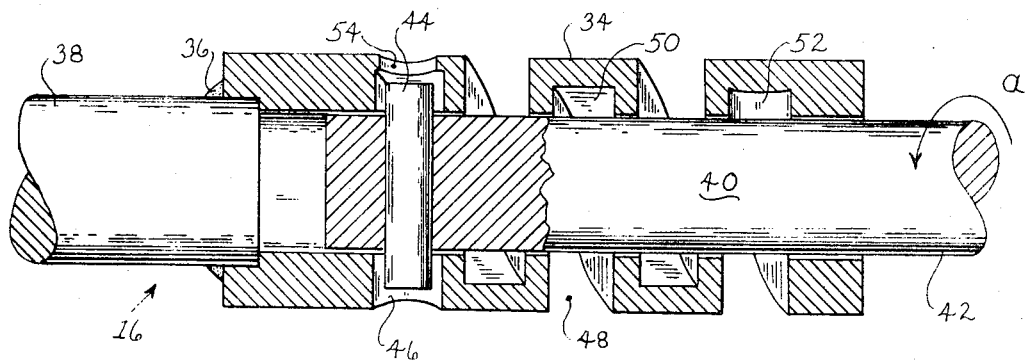
FIG. 4 is a sectional view of the helical element and stud according to this invention.

Referring now to FIG. 4, helical element or nut 34 is attached as by welding at 36 to segment 38 of the shaft 16. Also, stud portion 40 of segment 42 of the shaft 16 is threaded into the nut or helical element 34. Therefore, if the shaft 16 is rotating in the forward rotation "alpha", pin 44 will be resting against shoulder 46 which is the termination of helical slot 48 in the nut or helical element 34. The pin 44 extends diametrically through the stud 40.

Thus it may be seen that rotation is transmitted from the segment 42 of the shaft 16 through the nut 34 to the segment 38 of the shaft 16. Also, in the forward rotational direction "alpha", the shaft is short. If the shaft 16 is reversed and rotated in reverse direction "rho" (not shown in FIG. 4), the stud 40 will screw out of the nut 34 and the shaft 16 will be long. To express this another way, the pin 44 will move away from the shoulder 46 and move through the helical slot 48 to rest against shoulder 52, a position as more fully seen in FIG. 3.

Describing the helical element 34 in more detail, helical groove 50 is diametrically opposed to each portion of the slot 48. This helical groove terminates with the shoulder 52. The pin 44 rests upon a shoulder at the termination of slot 48 and a shoulder at the termination of groove 50 in either of the extreme positions which the rotation of the shaft 16 may carry it.

To remove the diametrical pin 44 in the stud 40, I have found it desirable to provide hole 54 in helical element 34. The pin 44 can be installed without the use of hole 54. The pin 44 is removed by driving the pin out with a punch through the hole 54.

Those skilled in the art will understand that a threaded stud and a conventional threaded nut could be used instead of the particular helical element 34 and pin stud 40 as illustrated. However, it will be understood that the system operates in one direction for several days with water and dust before it is reversed. Therefore, I prefer to use the particular helical element and stud as illustrated so it has a free, definite, certain movement despite sediments and corrosion caused by being constantly drenched by water. The elements are preferably made of stainless steel.

Thus it may be seen that when the direction of rotation of the shaft 16 is reversed to drive the system in an opposite direction, the shaft automatically changes length so the alignment mechanism operates properly for that direction of travel.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example do not point out what an infringement of this patent would be, but are to enable the reader to make and use the invention.

I claim as my invention:

1. In an agricultural irrigation system having
   a. an elongated pipe adapted to carry sprinklers thereon,
   b. means attached to the pipe for supplying water under pressure to the pipe,
   c. a plurality of vehicles movingly supporting the pipe,
   d. a drive shaft extending along the pipe,
   e. means attached to the drive shaft for rotating same in either a forward or reverse direction,
   f. drive means on each vehicle attached to the drive shaft for driving the vehicles responsive to rotation of the drive shaft,
   g. the drive shaft rotating in a forward rotation to drive the system in a forward direction and
   h. said drive shaft rotating in a reverse rotation to drive the system in a reverse direction,
   j. said drive shaft being means for measuring the curve of the pipe, and
   k. means for realigning a vehicle which is out of line responsive to the change of the length of the drive shaft,
   m. said realigning means utilizing elements which are pulled when the irrigation system is moving in a forward direction and pushed when the irrigation system is moving in the reverse direction;
   n. The improved structure for changing directions comprising:
   o. said shaft including two segments between each vehicle,
   p. one of said segments carrying a nut, the other carrying a stud,
   q. said stud threaded in the nut, and
   r. said stud screwing into and out of the nut responsive to changing from one direction of rotation to the other and back.

2. In an agricultural irrigation system having
   a. an elongated pipe adapted to carry sprinklers thereon,
   b. means attached to the pipe for supplying water under pressure to the pipe,
   c. a plurality of vehicles movingly supporting the pipe,
   d. a drive shaft extending along the pipe,
   e. means attached to the drive shaft for rotating same in either a forward or reverse direction,
   f. drive means on each vehicle attached to the drive shaft for driving the vehicles responsive to rotation of the drive shaft,
   g. the drive shaft rotating in a forward rotation to drive the system in a forward direction and
   h. said drive shaft rotating in a reverse rotation to drive the system in a reverse direction,
   j. said drive shaft being means for measuring the curve of the pipe, and
   k. means for realigning a vehicle which is out of line responsive to the change of the length of the drive shaft,
   m. said realigning means utilizing elements which are pulled when the irrigation system is moving in a forward direction and pushed when the irrigation system is moving in the reverse direction;
   n. The improved method of operation comprising:
   o. changing the length of the drive shaft responsive to the change from one direction of rotation to the other.

3. The invention as defined in claim 2 wherein changing the length of the shaft is by screwing a stud into a nut.

* * * * *